(12) United States Patent
McCloskey

(10) Patent No.: US 8,294,775 B2
(45) Date of Patent: Oct. 23, 2012

(54) FLUTTERING ILLUMINATION SYSTEM AND METHOD FOR ENCODING THE APPEARANCE OF A MOVING OBJECT

(75) Inventor: Scott McCloskey, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 386 days.

(21) Appl. No.: 12/604,012

(22) Filed: Oct. 22, 2009

(65) Prior Publication Data

US 2011/0096177 A1  Apr. 28, 2011

(51) Int. Cl.
*H04N 5/228* (2006.01)
*H04N 5/222* (2006.01)
*H04N 5/262* (2006.01)
*G03B 17/00* (2006.01)

(52) U.S. Cl. ............... 348/208.99; 348/371; 348/239; 396/55

(58) Field of Classification Search ................ None
See application file for complete search history.

(56) References Cited

U.S. PATENT DOCUMENTS

| | | | | |
|---|---|---|---|---|
| 5,264,916 | A | 11/1993 | Bushman | 356/364 |
| 7,580,620 | B2 * | 8/2009 | Raskar et al. | 396/55 |
| 7,639,289 | B2 * | 12/2009 | Agrawal et al. | 348/239 |
| 7,657,127 | B2 * | 2/2010 | Lolacono et al. | 382/312 |
| 7,756,407 | B2 * | 7/2010 | Raskar | 396/55 |
| 7,962,031 | B2 * | 6/2011 | Tsai | 396/173 |
| 2002/0122133 | A1 | 9/2002 | Ejima | |
| 2006/0245623 | A1 | 11/2006 | Loiacono et al. | 382/117 |
| 2007/0258706 | A1 | 11/2007 | Raskar et al. | 396/52 |
| 2007/0258707 | A1 | 11/2007 | Raskar | |
| 2008/0062287 | A1 | 3/2008 | Agrawal et al. | 348/241 |
| 2009/0232418 | A1 | 9/2009 | Lolacono et al. | 382/312 |

OTHER PUBLICATIONS

Agrawal, A. et al., "Coded Exposure Deblurring: Optimized Codes for PSF Estimation and Invertibility," *IEEE Conference on Computer Vision and Pattern Recognition* Jun. 20, 2009, Piscataway, NJ, pp. 2006-2073.
EP Search Report for EP application No. 10171932.6 dated Dec. 13, 2010.

* cited by examiner

*Primary Examiner* — Luong T Nguyen
(74) *Attorney, Agent, or Firm* — Kermit D. Lopez; Luis M. Ortiz; Kevin Soules

(57) ABSTRACT

A fluttering illumination system and method for encoding the appearance of a moving subject includes an image capturing device, a lens, a shutter, an illumination source, and a device to control illumination triggering and power. The image capturing device may be configured in a bulb shutter mode to integrate light patterns from the object upon the sensor via the shutter until a shutter release is open. The control device may be invoked to trigger several illuminations of varying power in a predetermined sequence by rapidly turning the illumination source on and off when the shutter release is open. The shutter release may then be closed following the firing of a last illumination in order to invertibly encode the appearance of the moving subject in a single image. Data indicative of a motion blur associated with the image may be estimated and the image processed to recover a sharp image without noise and ringing artifacts.

20 Claims, 5 Drawing Sheets

FLUTTERING ILLUMINATION SYSTEM AND METHOD FOR ENCODING THE APPEARANCE OF A MOVING OBJECT

GOVERNMENT RIGHTS

The United States Government has certain rights in this invention pursuant to Contract No. W91CRB-09-C-0013 between the U.S. Army RDECOM (Research Development and Engineering Command) and Honeywell International Inc.

TECHNICAL FIELD

Embodiments are generally related to image processing systems and methods. Embodiments are also related to techniques for encoding moving objects. Embodiments are additionally related to the estimation of motion blur in digital images.

BACKGROUND OF THE INVENTION

The capture of a high-quality image associated with a moving subject in a low-lighting situation is necessary for object monitoring and inspection applications such as, for example, a biometric acquisition system. Image capturing devices such as, for example, a digital camera often utilize flashes to provide a complementary light source during an image capturing process.

In some conventional image capturing devices, the capture of the high-quality image can be accomplished by the use of one or more short-duration flashes fired simultaneously. Such an approach consumes more electric power. Thus, proper exposure compensation cannot be achieved due to the inability to adjust flash intensity immediately. Additionally, the power of a point flash falls off rapidly with distance and the amount of power required to illuminate the distant subject can rapidly exceed the illumination power of a battery of flashes. Furthermore, the amount of power that a flash may need to sufficiently illuminate the distant subject may easily exceed eye safety limits. Some prior art approaches have attempted to solve such problems by spreading the flash output over a longer time (i.e. staggering multiple flashes in time). However, non-stationary objects in a scene may appear ghosted in a resulting image. Also, processing such image to recover a sharp image may amplify noise and introduce other artifacts.

Based on the foregoing, it is believed that a need exists for an improved system and method for encoding appearance of a moving subject utilizing a fluttering flash. A need also exists for an improved method for acquiring a sufficiently exposed and sharp image associated with the moving subject in a low-light situation, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved image processing system and method.

It is another aspect of the disclosed embodiments to provide for an improved fluttering flash system and method for encoding appearance of a moving subject.

It is a further aspect of the disclosed embodiments to provide for an improved method and system for acquiring a sufficiently exposed and sharp image of the moving subject in a low-light situation.

It is yet another aspect of the disclosed embodiments to provide for an improved method for estimating motion blur associated with the image.

The aforementioned aspects and other objectives and advantages can now be achieved as described herein. A fluttering flash system and method for encoding appearance of a moving subject includes an image capturing device, a lens, a shutter, one or more illumination sources, and a device to control illumination triggering and power. Note that the shutter need not be a physical shutter. An electronic shutter may be utilized as the shutter. The image capturing device may be configured in a bulb shutter mode or via a traditional, fixed-length shutter to integrate light patterns from the object upon the sensor via the lens while a shutter release is open. Note that if the length of the illumination sequence is known, the shutter need only be at least this length, and the bulb setting may not be necessary. The control device may be invoked to trigger several illuminations of varying power in a predetermined sequence by rapidly turning the illumination source on and off when the shutter release is open. The shutter release may then be closed following the firing of a last illumination (e.g., such as a flash) in order to invertibly encode appearance of the moving subject in a single image. Data indicative of a motion blur associated with the image may be estimated and the image is processed to recover a sharp image without noise and ringing artifacts.

Note that the illumination timing sequence, along with motion, can determine the point spread function and may be selected before exposure. The point spread function can be estimated from the image after exposure and readout, but such an estimation does not necessarily involve the selected sequence.

A direction and extent of motion during acquisition of the moving object may be estimated and the moving region de-blurred utilizing a de-convolution approach. The blur point spread function associated with the moving regions may be determined based on a trajectory and speed of an individual object. The image capturing device captures sufficiently-exposed, sharply-focused images associated with the moving subject in low light by staggering the illuminations (e.g., flashes) associated with the illumination source. The system does not consume more electric power and proper exposure compensation can be achieved by adjusting the illumination intensity.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
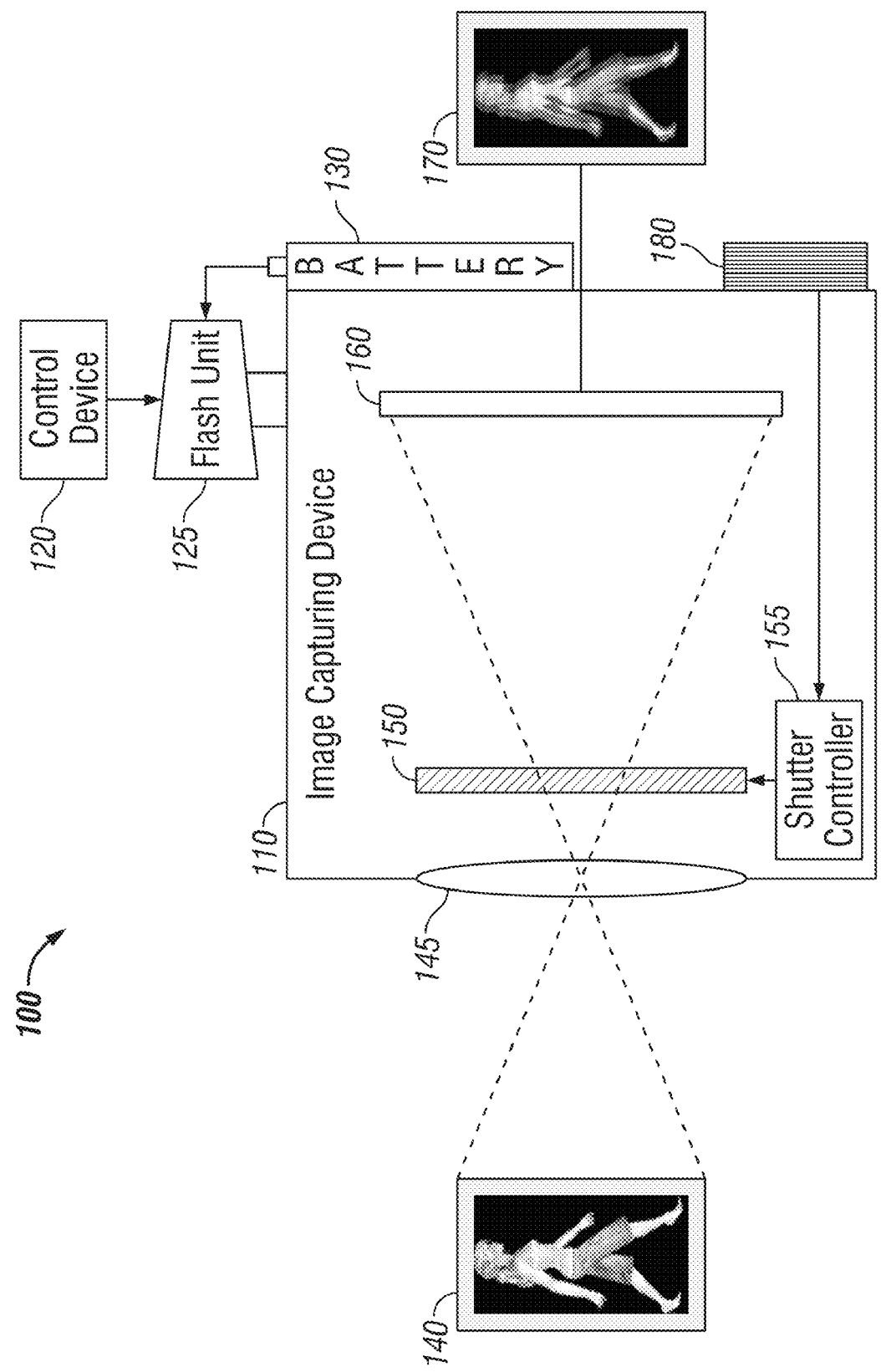
FIG. 1 illustrates a block diagram of a fluttering illumination system, in accordance with the disclosed embodiments.

FIG. 1 illustrates a block diagram of a fluttering illumination system 100, in accordance with the disclosed embodiments. Note that in FIGS. 1-7, identical or similar parts are generally indicated by identical reference numerals. The fluttering illumination system 100 may be employed for encoding the appearance of a moving subject in a single image. The system 100 generally includes an image capturing device 110 that includes a lens 145, an image sensor 160, and a shutter 150 associated with a shutter controller 155 to control operation of the shutter 150. The image capturing device 110, the lens 145, the image sensor 160, the shutter 150, and the shutter controller 155 communicate electronically with each other.

The image capturing device 110 described herein may be, for example, a digital camera, a camcorder, or an electronic device with video capturing capabilities, depending upon design considerations. The image capturing device 110 captures an image 170 of a reflection associated with an object, for example, a subject 140 moving at high speed. The subject 140 may be positioned near the image capturing device 110 or may be positioned at a large stand-off distance from the image capturing device 110.

The system 100 may be employed in association with various image-based recognition systems for identifying an object within an environment. Note that the term "subject" may be utilized interchangeably with the term "object". The sensor 160 may include an array of pixels for capturing an image of the moving subject 140. The image capturing device 110 may be equipped with the shutter 150 in association with the lens 145 which opens at a predetermined time in order to provide a more distinct image of the subject 140. The image capturing device 110 may be configured in a bulb shutter mode where release of the shutter 150 exposes the sensor 160 instantaneously to capture light from the subject 140. In general, the bulb shutter mode holds the shutter 150 open (or activated) for as long as a shutter release button is held down for long exposures.

The release of the shutter 150 may be controlled by the shutter controller 155 associated with the image capturing device 110. The shutter controller 155 may be included in the system 100 to provide a variety of control functions, such as to control the shutter 150 in association with the opening of the lens 145 as a picture is being taken. Shutter controller 155 also operates in response to an external shutter release signal to synchronize the actuation of an illumination source 125. The image capturing device 110 further includes a control device 120 to control illumination triggering and power with respect to the illumination source 125. The control device 120 may be invoked upon the opening of the shutter 150 and triggers several illuminations (e.g., flashes) of varying power in a predetermined sequence by rapidly turning the illumination source 125 on and off. Note that the illumination source 125 may be commonly built directly into the image capturing device 110. In addition, the illumination source 125 may be mounted separately via a standardized accessory mount bracket.

The illumination may be adjusted for optimum exposure and the image 170 associated with the subject 140 may be taken. The illumination source 125 generates a series of illuminations with different power to determine optimum illumination energy for proper exposure. The image capturing device 110 may be equipped with a motion knob 180 for manual control. The knob 180 may also be employed to manually control the control device 120 in order to set the predetermined sequence of illuminations. Note that the image capturing device 110 may also have an "auto-flutter" facility, wherein the camera electronics can determine the best coded sequence. A power source battery 130 energizes the electronic illumination source 125 and may be consumed to provide illumination via the illuminations.

The illumination source 125 irradiates the subject 140 and photons reflected from the subject 140 may be captured by the image capturing device 110. The control device 120 provides a fluttering illumination by rapidly turning the illumination source 125 on and off rather than leaving the shutter 150 open for the entire exposure time. The release of the shutter 150 may be closed following the firing of a last illumination and a latent image associated with the subject 140 on the sensor 160 can be digitized and read out. The captured image 170 represents an image scene that defines the original subject 140. The fluttering illumination system 100 is capable of sufficiently acquiring an exposed and sharp image of the moving subject 140 in a low-light situation even when the subject 140 is moving quite fast.

Figure 2:
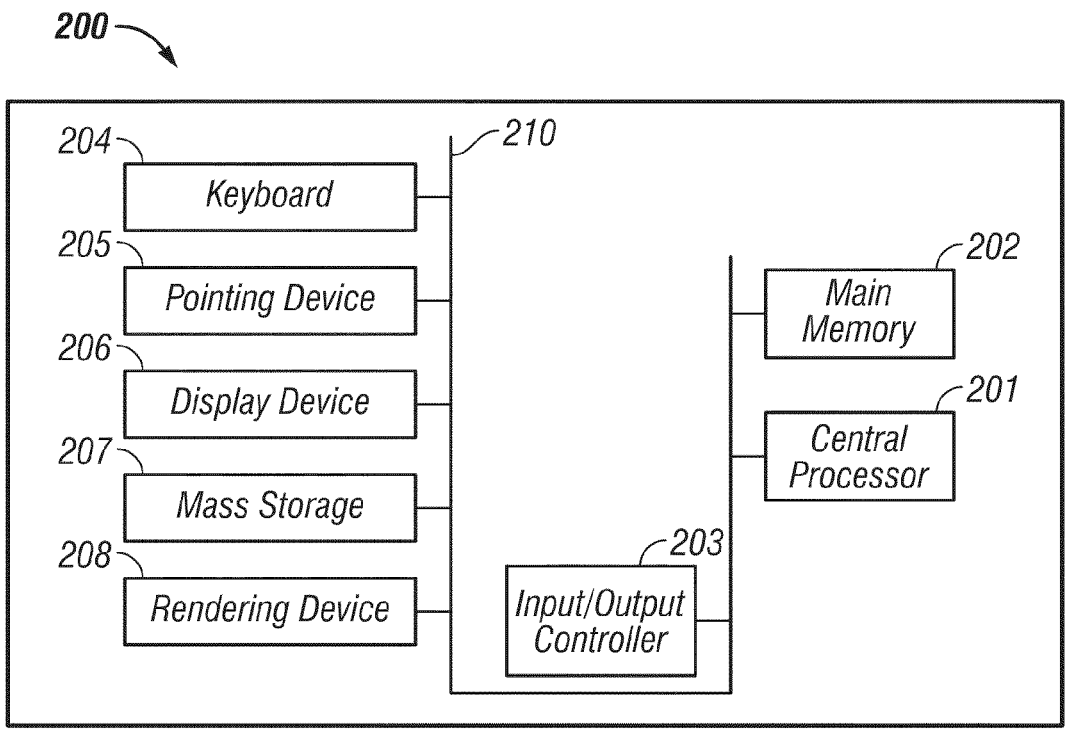
FIG. 2 illustrates a schematic view of a data-processing system in which an embodiment may be implemented.
Figure 3:
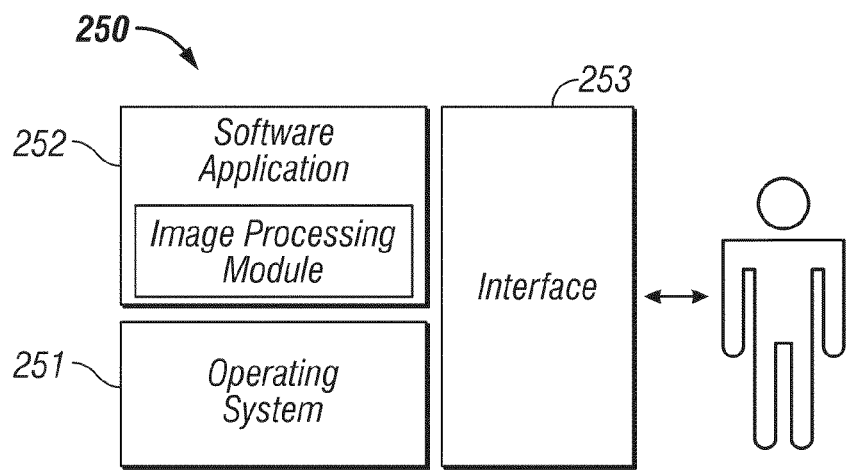
FIG. 3 illustrates a schematic view of a software system including an operating system, application software, and a user interface for carrying out an embodiment.

FIGS. 2-3 are provided as exemplary diagrams of data processing environments in which embodiments of the present invention may be implemented. It should be appreciated that FIGS. 2-3 are only exemplary and are not intended to assert or imply any limitation with regard to the environments in which aspects or embodiments of the disclosed embodiments may be implemented. Many modifications to the depicted environments may be made without departing from the spirit and scope of the present invention.

As illustrated in FIG. 2, the disclosed embodiments may be implemented in the context of a data-processing system 200 comprising, for example, a central processor 201, a main memory 202, an input/output controller 203, a keyboard 204, a pointing device 205 (e.g., mouse, track ball, pen device, or the like), a display device 206, and a mass storage 207 (e.g., hard disk). Additional input/output devices, such as a rendering device 208 (e.g., printer, scanner, fax machine, etc), for example, may be associated with the data-processing system 200 as desired. As illustrated, the various components of data-processing system 200 communicate electronically through a system bus 210 or similar architecture. The system bus 210 may be a subsystem that transfers data between, for example, computer components within data-processing system 200 or to and from other data-processing devices, components, computers, etc.

FIG. 3 illustrates a computer software system 250 for directing the operation of the data-processing system 200 depicted in FIG. 2. Software application 252, stored in main memory 202 and on mass storage 207, includes a kernel or operating system 251 and a shell or interface 253. One or more application programs, such as software application 252, may be "loaded" (i.e., transferred from mass storage 207 into the main memory 202) for execution by the data-processing system 200. The data-processing system 200 receives user commands and data through a user interface 253; these inputs may then be acted upon by the data-processing system 200 in accordance with instructions from an operating module 252 and/or an application module.

The following discussion is intended to provide a brief, general description of suitable computing environments in which the system and method may be implemented. Although not required, the disclosed embodiments will be described in the general context of computer-executable instructions, such as program modules, being executed by a single computer.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 253, which is preferably a graphical user interface (GUI), can serve to display results, whereupon a user may supply additional inputs or terminate a particular session. In some embodiments, operating system 251 and interface 253 can be implemented in the context of a "Windows" system. It can be appreciated, of course, that other types of operating systems and interfaces may be alternatively utilized. For example, rather than a traditional "Windows" system, other operation systems such as, for example, Linux may also be employed with respect to operating system 251 and interface 253. The software application 252 may include an image processing module that can be adapted for estimating motion blur associated with the image 170 of the moving subject 140 by adjusting timing and power of each illumination. Module 252 can be adapted for processing the image 170 to recover a sharp image without noise and ringing artifacts. Software application module 252, on the other hand, can include instructions such as the various operations described herein with respect to the various components and modules described herein such as, for example, the method 500 depicted in FIG. 5.

The description herein is presented with respect to particular embodiments of the present invention, which may be embodied in the context of a data-processing system such as, for example, data-processing system 200 and computer software system 250 illustrated with respect to FIGS. 2-3. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, UNIX, LINUX, and the like.

Figure 4:
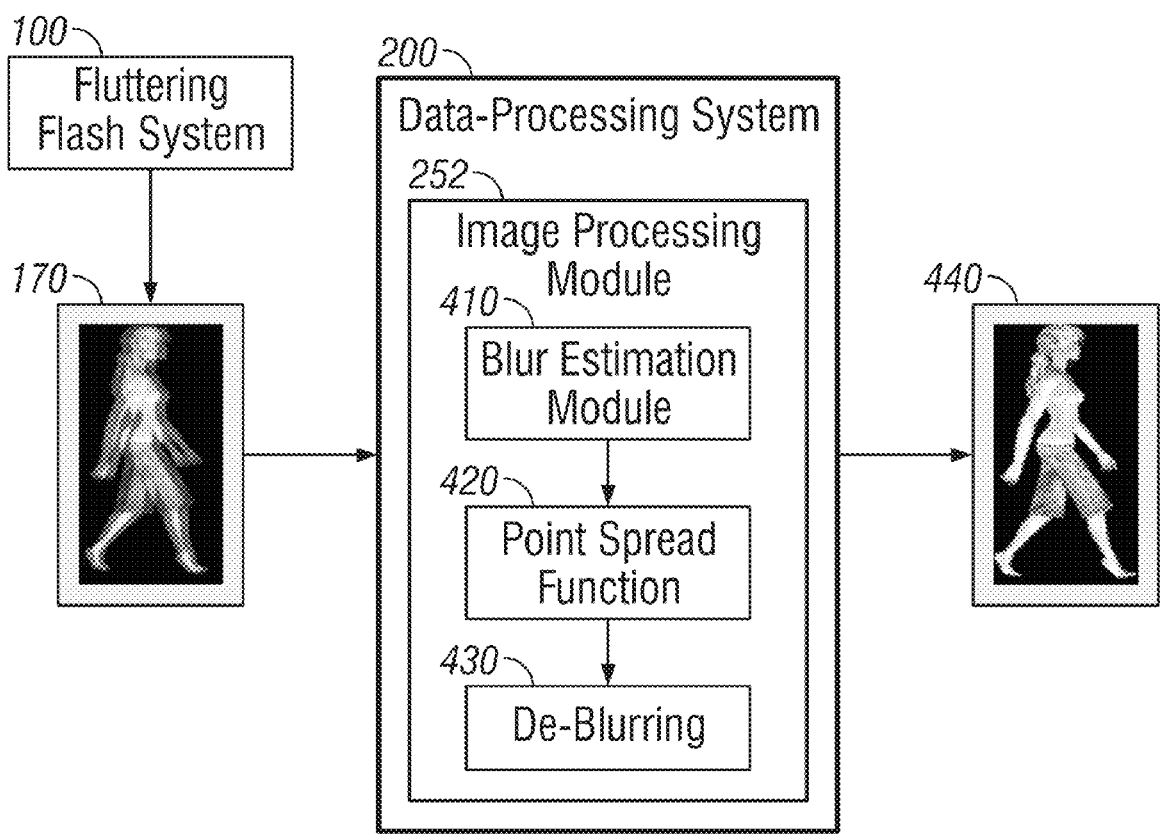
FIG. 4 illustrates a block diagram of the fluttering illumination system associated with an image processing unit, in accordance with the disclosed embodiments.

FIG. 4 illustrates a block diagram of the fluttering illumination system 100 associated with an image processing module 252, in accordance with the disclosed embodiments. The image processing module 252 may be a software application including computer executable instructions executed by the data processing system 200, or other computing system environment. The image processing module 252 may run as a stand-alone digital video tool, an embedded function, or may be incorporated into other digital image/video applications to provide enhanced functionality. The image processing module 252 includes a motion blur estimation module 410 that can be programmed to estimate a motion blur associated with the image 170. Note that, as utilized herein, motion blur is the result of relative motion between the image capturing device 110 and the scene during integration or "exposure time" while acquiring an image.

The timing and power of each illumination obtained from the illumination source 125 associated with the fluttering illumination system 100 may be employed to design the point spread function (PSF) 420 of moving regions based on the trajectory and speed of individual objects. The point spread function 420 may be estimated to obtain the image 440 from the blurred image 170. When the subject 140 is divided into discrete point objects of varying intensity, the image 170 may be computed as a sum of the PSF 420 of each point. In general, the point spread function 420 describes the response of the system 100 to a point source or point object. A more general term for the PSF 420 is a system's impulse response, the PSF 420 being the impulse response of the system 100. As the PSF 420 is typically determined entirely by the system 100, the entire image can be described by knowing the optical properties of the system 100. This process is usually formulated by a convolution equation. In general, the blur estimation module 410 produces the point spread function 420 as an output, and the PSF 420 is in turn an input to the deblurring functionality 430. The output of the deblurring step is the sharp image, as shown.

The direction of motion blur in the image 170 and extent of motion during acquisition may be determined by the blur estimation module 410. The moving region may then be de-blurred as indicated by the blurring functionality 430 using one of a number of de-convolution techniques. These are the mathematical form of separating between the convolved image and the convolution PSF 420 in order to obtain an image 440 with sharp focus. The blur estimation module 410 may correct the motion blur image 170 degraded by the isotropic blur that is evident in out-of-focus images and in those produced utilizing long-distance imaging. Image correction may be accomplished by extracting the blur function automatically from the acquired image 170 via a direct and expeditious process that generates stable output. The quality of the corrected image 440 typically exceeds that of the existing techniques.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 5:
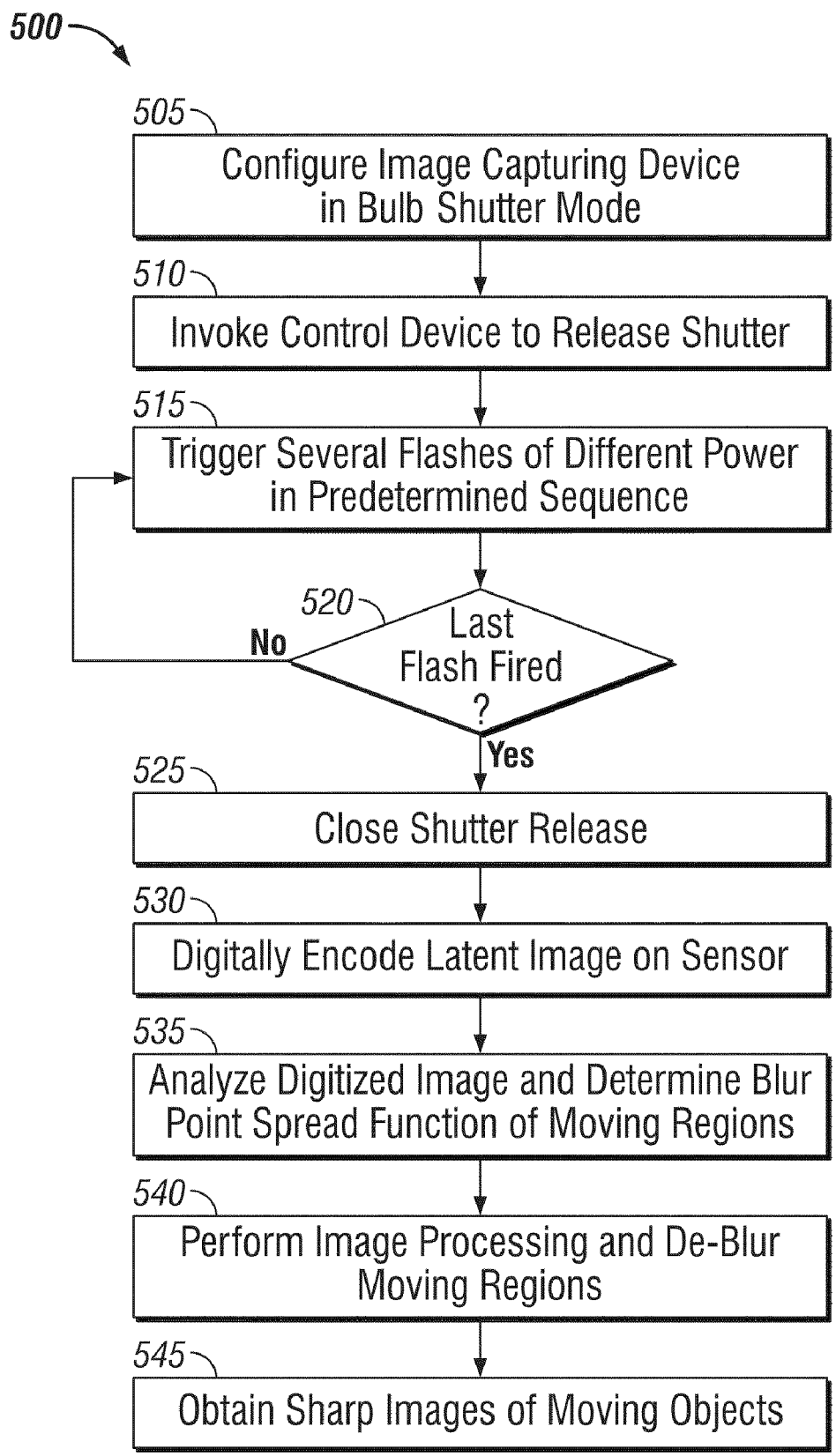
FIG. 5 illustrates a high level flow chart of operations illustrating logical operational steps of a method for acquiring an image of a moving subject in a low-light situation utilizing the fluttering illumination system, in accordance with the disclosed embodiments.

FIG. 5 illustrates a high level flow chart of operations illustrating logical operational steps of a method 500 for acquiring the sufficiently exposed and sharp image 440 of the moving subject 140 in a low-light situation utilizing the fluttering illumination system 100, in accordance with the disclosed embodiments. Again as a reminder, in FIGS. 1-7 identical or similar parts are generally indicated by identical reference numerals. The image capturing device 110 can be configured in the bulb shutter mode, as illustrated at block 505. The control device 120 may then be invoked to release the shutter 150, as indicated at block 510.

The illuminations of varying power from the illumination source 125 can be triggered in a predetermined sequence via the control device 120, as depicted at block 515. A determination can be made whether the last illumination is fired, as illustrated at block 520. If the last illumination is fired, the shutter 150 may be closed, as indicated at block 525. Otherwise, the illumination may be triggered in accordance with the pre-computed sequence. The latent image on the sensor 160 may then be digitally encoded, as depicted at block 530. Thereafter, the encoded digital image 170 can be analyzed and the blur PSF of moving regions may be determined, as illustrated at block 535. The image processing may be performed to de-blur the moving regions, as indicated at block 540. The sharp image 440 with respect to the moving object 140 may be obtained, as depicted at block 545.

Figure 6:
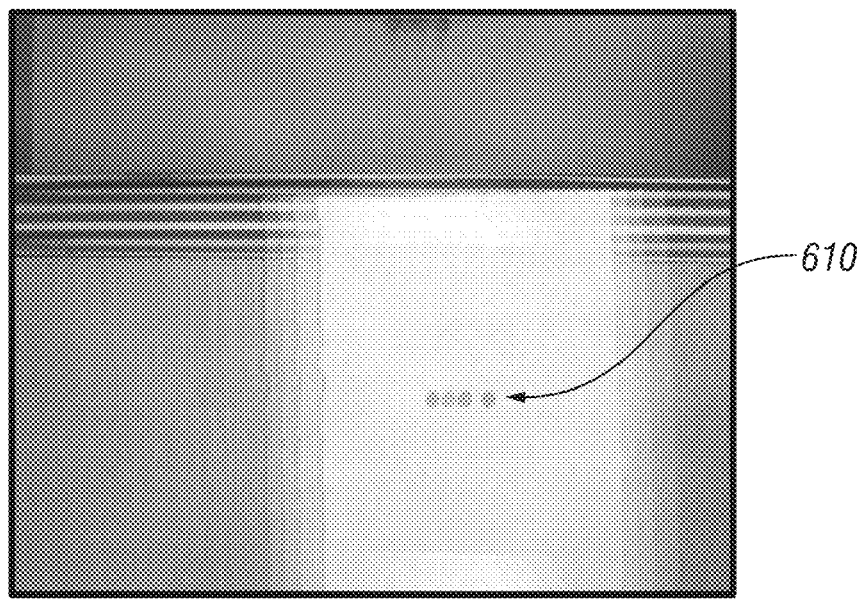
FIG. 6 illustrates an image of a moving subject captured by the fluttering illumination system, in accordance with the disclosed embodiments.

FIG. 6 illustrates a screenshot of an image 600 associated with a moving object 610 captured by the fluttering illumination system 100, in accordance with the disclosed embodiments. The fluttering illumination system 100 integrates light on the sensor 160 by implementing the fluttering illumination and generates the image 600 with a sharp focus despite the motion of the object 610. The blur estimation module 410 may estimate the blur PSF of the moving region utilizing the timing and power of each illumination associated with fluttering illumination system 100. The direction and extent of motion during acquisition may then be estimated.

Figure 7:
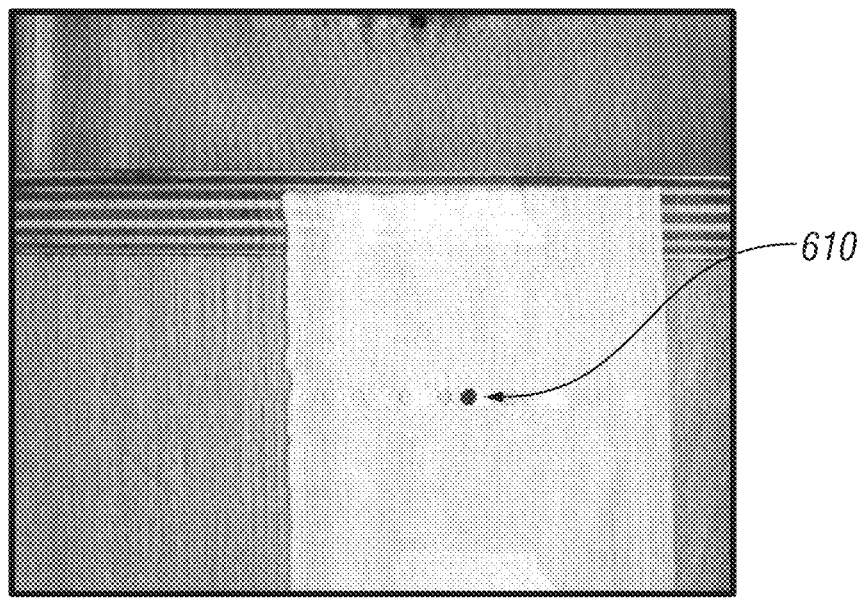
FIG. 7 illustrates a de-blurred image corresponding to the image depicted in FIG. 6, in accordance with the disclosed embodiments.

FIG. 7 illustrates a screenshot of a de-blurred image 700 corresponding to the image 600 depicted in FIG. 6, in accordance with the disclosed embodiments. The blur estimation module 410 may then de-blur the image 600 utilizing the image processing techniques based on the estimated PSF to generate the de-blurred image of the object 610.

The fluttering illumination system 100 in association with the image processing module 252 can be adapted to generate noise free and motion blur free high quality images even when the subject 140 may be moving fast and/or unexpectedly. The system 100 does not consume more electric power and proper exposure compensation can be achieved by adjusting the illumination intensity. The method and system described herein may be incorporated into any type of image capturing device and employed in the increasingly common long-distance surveillance systems prevalent in security/homeland security applications.

Based on the foregoing, it can be appreciated that a method is disclosed for encoding the appearance of a moving object. Such a method includes: integrating in a shutter mode, patterns from a moving object to be acquired from a sensor via a shutter associated with an image capturing device having a shutter release for the duration of an illumination sequence; invoking a control device associated with the illumination source to trigger illuminations of varying power in accordance with a predetermined sequence by rapidly turning the illumination source on and off when the shutter is open; and closing the shutter release following a firing of a last flash in order to invertibly encode an appearance of the moving object in a single image and thereby allowing a recovery of a well-focused appearance of the moving object.

Embodiments of such a method may include analyzing the image to determine a blur point spread function with respect to one or more moving regions and estimating a direction and an extent of motion during an acquisition of the moving object to derive a blur estimation that enables de-blurring to generate a sharp image without noise and a ringing artifact. Blur estimation may be based on a Fourier domain analysis. Alternatively, blur estimation may be based on an analysis of statistical correlations of pixel intensity values. Such a method may also include digitally encoding a latent image associated to the moving object on the sensor and/or de-blurring the image with respect to the moving object utilizing at least one image processing technique. Additionally, the image processing technique utilized may constitute, for example, a de-convolution approach. The disclosed method may also include determining the blur point spread function associated with the moving regions based on a trajectory and a speed of the moving object, and controlling the shutter release via a shutter controller.

Based on the foregoing, it can also be appreciated that a system is disclosed for encoding the appearance of a moving object. Such a system may include a processor, a data bus coupled to the processor, and a computer-usable medium embodying computer code, the computer-usable medium being coupled to the data bus. The aforementioned computer program code may include instructions executable by the processor and configured for integrating in a shutter mode, patterns from a moving object to be acquired from a sensor via a shutter associated with an image capturing device having a shutter release for the duration of an illumination sequence; invoking a control device associated with illumination source to trigger illuminations of varying power in accordance with a predetermined sequence by rapidly turning the illumination source on and off when the shutter is open; and closing the shutter release following a firing of a last flash in order to invertibly encode an appearance of the moving object in a single image and thereby allowing a recovery of a well-focused appearance of the moving object.

The aforementioned instructions can be further configured for analyzing the image to determine a blur point spread function with respect to one or more moving regions and estimating a direction and an extent of motion during an acquisition of the moving object to derive a blur estimation that enables de-blurring to generate a sharp image without noise and a ringing artifact. In the context of such a system, blur estimation may be based on a Fourier domain analysis and/or on an analysis of statistical correlations of pixel intensity values.

The aforementioned instructions can be further configured for digitally encoding a latent image associated to the moving object on the sensor and/or further configured for de-blurring the image with respect to the moving object utilizing at least one image processing technique. In the context of such a system, the image processing technique may be a de-convolution approach. Note additionally that the aforementioned instructions can be further configured for determining the blur point spread function associated with the moving regions based on a trajectory and a speed of the moving object.

Based on the foregoing, it can be further appreciated that a computer-usable medium and embodiments thereof are disclosed for encoding the appearance of a moving object and the computer-usable medium embodying computer program code. Such computer program code generally includes computer executable instructions configured for integrating in a shutter mode, patterns from a moving object to be acquired from a sensor via a shutter associated with an image capturing device having a shutter release for the duration of an illumination sequence; invoking a control device associated with an illumination source to trigger illuminations of varying power in accordance with a predetermined sequence by rapidly turning the illumination source on and off when the shutter is open; and closing the shutter release following a firing of a last flash in order to invertibly encode an appearance of the moving object in a single image and thereby allowing a recovery of a well-focused appearance of the moving object.

The embodied computer program code further includes computer executable instructions configured for analyzing the image to determine a blur point spread function with respect to one or more moving regions and estimating a direction and an extent of motion during an acquisition of the moving object to derive a blur estimation that enables de-blurring to generate a sharp image without noise and a ringing artifact, wherein the blur estimation is based on a Fourier domain analysis and/or on an analysis of statistical correlations of pixel intensity values. The embodied computer program code further includes computer executable instructions, which may be configured for digitally encoding a latent image associated with the moving object on the sensor and de-blurring the image with respect to the moving object utilizing at least one image processing technique.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for encoding an appearance of a moving object, said method comprising:
   integrating in a shutter mode, patterns from the moving object to be acquired from a sensor via a shutter associated with an image capturing device having a shutter release for a duration of an illumination sequence;
   invoking a control device associated with an illumination source to trigger a plurality of illuminations of varying power in accordance with a predetermined sequence by rapidly turning said illumination source on and off when said shutter is open; and
   closing said shutter release following a firing of a last illumination source in order to invertibly encode the appearance of said moving object in a single image and thereby allowing a recovery of a well-focused appearance of said moving object.

2. The method of claim 1 further comprising:
   analyzing said single image to determine a blur point spread function ion with respect to at least one moving region; and
   estimating a direction and an extent of motion during an acquisition of said moving object to derive a blur estimation that enables de-blurring to generate a sharp image without noise and a ringing artifact.

3. The method of claim 2 wherein said blur estimation is based on a Fourier domain analysis.

4. The method of claim 2 wherein said blur estimation is based on an analysis of statistical correlations of pixel intensity values.

5. The method of claim 1 further comprising digitally encoding a latent image associated to said moving object on said sensor.

6. The method of claim 1 further comprising de-blurring said image with respect to said moving object utilizing at least one image processing technique.

7. The method of claim 6 wherein said at least one image processing technique comprises a de-convolution approach.

8. The method of claim 1 further comprising determining a blur point spread function associated with at least one moving region based on a trajectory and a speed of said moving object.

9. The method of claim 1 further comprising controlling said shutter release via a shutter controller.

10. A system for encoding an appearance of a moving object, said system comprising:
    a processor;
    a data bus coupled to said processor; and
    a computer-usable medium embodying computer code, said computer-usable medium being coupled to said data bus, said computer code comprising instructions executable by said processor and configured for:
       integrating in a shutter mode, patterns from the moving object to be acquired from a sensor via a shutter associated with an image capturing device having a shutter release for a duration of an illumination sequence;
       invoking a control device associated with an illumination source to trigger a plurality of illuminations of varying power in accordance with a predetermined sequence by rapidly turning said illumination source on and off when said shutter is open; and
       closing said shutter release following a firing of a last illumination source in order to invertibly encode the appearance of said moving object in a single image and thereby allowing a recovery of a well-focused appearance of said moving object.

11. The system of claim 10 wherein said instructions are further configured for:
    analyzing said image to determine a blur point spread function with respect to at least one moving region; and
    estimating a direction and an extent of motion during an acquisition of said moving object to derive a blur estimation that enables de-blurring to generate a sharp image without noise and a ringing artifact.

12. The system of claim 11 wherein said blur estimation is based on a Fourier domain analysis.

13. The system of claim 11 wherein said blur estimation is based on an analysis of statistical correlations of pixel intensity values.

14. The system of claim 10 wherein said instructions are further configured for digitally encoding a latent image associated to said moving object on said sensor.

15. The system of claim 10 wherein said instructions are further configured for de-blurring said single image with respect to said moving object utilizing at least one image processing technique.

16. The system of claim 15 wherein said at least one image processing technique comprises a de-convolution approach.

17. The system of claim 10 wherein said instructions are further configured for:
    determining said blur point spread function associated with said at least one moving region based on a trajectory and a speed of said moving object.

18. A non-transitory computer-usable medium for encoding an appearance of moving object, said non-transitory computer-usable medium embodying computer program code, said computer program code comprising computer executable instructions configured for:

integrating in a shutter mode, patterns from the moving object to be acquired from a sensor via a shutter associated with an image capturing device having a shutter release for a duration of an illumination sequence;

invoking a control device associated with an illumination source to trigger a plurality of illuminations of varying power in accordance with a predetermined sequence by rapidly turning said illumination source on and off when said shutter is open; and closing said shutter release following a firing of a last illumination source in order to invertibly encode the appearance of said moving object in a single image and thereby allowing a recovery of a well-focused appearance of said moving object.

19. The non-transitory computer-usable medium of claim 18 wherein said embodied computer program code further comprises computer executable instructions configured for:

analyzing said single image to determine a blur point spread function with respect to at least one moving region; and estimating a direction and an extent of motion during an acquisition of said moving object to derive a blur estimation that enables de-blurring to generate a sharp image without noise and a ringing artifact, wherein said blur estimation is based on a Fourier domain analysis and/or on an analysis of statistical correlations of pixel intensity values.

20. The non-transitory computer-usable medium of claim 18 wherein said embodied computer program code further comprises computer executable instructions configured for:

digitally encoding a latent image associated to said moving object on said sensor; and de-blurring said image with respect to said moving object utilizing at least one image processing technique.

\* \* \* \* \*